(12) United States Patent
Fujita et al.

(10) Patent No.: US 8,205,798 B2
(45) Date of Patent: Jun. 26, 2012

(54) CARD HOLDING APPARATUS

(75) Inventors: Shinji Fujita, Osaka (JP); Syuji Yasuoka, Osaka (JP); Isao Shimada, Hyogo (JP)

(73) Assignee: Panasonic Corporation, Osaka (JP)

( * ) Notice: Subject to any disclaimer, the term of this patent is extended or adjusted under 35 U.S.C. 154(b) by 34 days.

(21) Appl. No.: 12/639,440

(22) Filed: Dec. 16, 2009

(65) Prior Publication Data

US 2010/0147946 A1   Jun. 17, 2010

(30) Foreign Application Priority Data

Dec. 17, 2008   (JP) ................................. 2008-321396

(51) Int. Cl.
*G06K 7/00* (2006.01)
(52) U.S. Cl. ........ 235/486; 235/435; 235/436; 235/439; 235/441
(58) Field of Classification Search .................. 235/441, 235/439, 486, 435, 436, 449
See application file for complete search history.

(56) References Cited

U.S. PATENT DOCUMENTS

| 5,317,138 | A | * | 5/1994 | Togawa .......................... 235/440 |
| 5,686,714 | A | | 11/1997 | Abe et al. |
| 5,929,427 | A | * | 7/1999 | Harada et al. .................. 235/492 |
| 5,949,047 | A | | 9/1999 | Abe et al. |
| 6,450,408 | B2 | * | 9/2002 | Shiue ............................. 235/492 |
| 2007/0032135 | A1 | * | 2/2007 | Tanaka et al. .................. 439/628 |

FOREIGN PATENT DOCUMENTS

JP   8-077312 A   3/1996

* cited by examiner

*Primary Examiner* — Daniel Hess
*Assistant Examiner* — Tabitha Chedekel
(74) *Attorney, Agent, or Firm* — Hamre, Schumann, Mueller & Larson, P.C.

(57) ABSTRACT

A card holding apparatus of the present invention includes a seal member 12 that is provided so as to surround the periphery of a contact terminal portion 11. When a lid 3 is positioned in a closed position with a smart card 100 retained by the lid 3, the seal member 12 comes into close contact with the periphery of a terminal 101. Thus, even when foreign matter such as water or dust intrudes into a space between the lid 3 and a housing 1, adhesion of such foreign matter to contact terminals 11a or the terminal 101 can be prevented.

4 Claims, 12 Drawing Sheets

CARD HOLDING APPARATUS

BACKGROUND OF THE INVENTION

1. Field of the Invention

The present invention relates to a card holding apparatus into which a card-type memory medium having a terminal on a principal face thereof can be loaded.

2. Description of Related Art

Recently, some information devices such as notebook computers are provided with a slot into which a card-type memory medium called "a smart card" can be loaded removably in order to improve security. Physical characteristics and electrical characteristics of smart cards are standardized based on the international standard ISO 7816. Moreover, in the Japanese Industrial Standard, the physical characteristics, the locations and the dimensions of external terminals, and the like of smart cards are defined in "JIS X 6303". A smart card has a main body in the form of a card having dimensions of, for example, about 95 mm in width, about 54 mm in depth, and about 0.5 to 1.0 mm in thickness and an IC chip (an integrated circuit) built into the main body, and a terminal electrically connected to the IC chip is disposed and exposed on at least one of the principal faces of the smart card. Such IC chips include those having a function of being capable of storing various types of information such as security information and those having a function of being capable of performing arithmetic processing.

Examples of a card holding apparatus into which a smart card as described above can be loaded removably include those of a type that can be built into an information device and of an external type that can be connected to a predetermined communication terminal provided in an information device. To load a smart card into such card holding apparatuses, a structure in which the smart card is inserted into a predetermined opening of the card holding apparatus in a sliding manner and pressed against a connector within the card holding apparatus commonly is used.

When a terminal electrode disposed in the card holding apparatus in an exposed state and the terminal of the IC chip provided in the smart card are brought into electrical contact with each other, the card holding apparatus can read data from the smart card or write data to the smart card.

Since the card holding apparatus has the directly exposed terminal electrode disposed in the opening into or from which the smart card is inserted or removed, it is difficult to adopt a waterproof structure. In other words, since water can enter the card holding apparatus through the opening for insertion of the smart card, waterproof properties cannot be secured.

JP H08-077312A discloses a smart card reader having a waterproof structure. The smart card reader disclosed in JP H08-077312A includes a seal member that is provided so as to surround the outer periphery of a containing portion for containing an entire smart card, after a smart cart is contained in the containing portion. This seal member encloses the smart card and the containing portion by coming into close contact with an outer lid. The configuration disclosed in JP H08-077312A allows the seal member to suppress the entry of water into the containing portion, and thus the card reader can have a waterproof structure.

However, with the configuration disclosed in JP H08-077312A, when loading a smart card into the containing portion, it is necessary to engage an outer peripheral edge portion of the smart card with a seal member. Accordingly, the processes for loading or removing the smart card are cumbersome.

SUMMARY OF THE INVENTION

It is an object of the present invention to provide a card holding apparatus that facilitates loading and removal of a smart card and yet can be waterproofed.

A card holding apparatus of the present invention is a card holding apparatus into which a card-type memory medium having a terminal on a principal face thereof can be loaded, the card holding apparatus including a housing; a lid that is rotatably supported by the housing and disposed on a principal face of the housing; retaining portions that are formed on an inner face of the lid opposite the principal face of the housing and can retain the card-type memory medium; contact terminals that are disposed on the principal face of the housing opposite the lid and can be brought into contact with the terminal of the card-type memory medium; a contact terminal portion in which the contact terminals are arranged; and an elastic member surrounding a periphery of the contact terminal portion, wherein a distal end face of the elastic member opposite the lid has a height that allows the distal end face of the elastic member to come into surface contact in a flat manner with the inner face of the lid when the lid is in a position in close proximity to the principal face of the housing.

According to the present invention, since the seal member is disposed only around the terminal, and a structure in which the contact terminals can be hermetically sealed by rotating the lid to the position opposite and in close proximity to the principal face of the housing is employed, the smart card can be loaded and removed easily and the contact terminals also can be protected from water.

DETAILED DESCRIPTION OF THE INVENTION

A card holding apparatus of the present invention is a card holding apparatus into which a card-type memory medium having a terminal on a principal face thereof can be loaded, the card holding apparatus including a housing; a lid that is rotatably supported by the housing and disposed on a principal face of the housing; retaining portions that are formed on an inner face of the lid opposite the principal face of the housing and can retain the card-type memory medium; contact terminals that are disposed on the principal face of the housing opposite the lid and can be brought into contact with the terminal of the card-type memory medium; a contact terminal portion in which the contact terminals are arranged; and an elastic member surrounding a periphery of the contact terminal portion, wherein a distal end face of the elastic member opposite the lid has a height that allows the distal end face of the elastic member to come into surface contact in a flat manner with the inner face of the lid when the lid is in a position in close proximity to the principal face of the housing.

The card holding apparatus of the present invention is based on the above-described configuration and can have aspects as described below. That is to say, in the card holding apparatus of the present invention, the elastic member can come into surface contact with the principal face of the card-type memory medium when the lid with the card-type memory medium loaded therein is in the position in close proximity to the principal face of the housing. With such a configuration, the contact terminal portion can be hermetically sealed when the card-type memory medium is loaded into the present apparatus, so that even when foreign matter such as water intrudes into a space sandwiched between the lid and the housing from the outside, adhesion of such foreign matter to the contact terminals can be prevented.

In the card holding apparatus of the present invention, the distal end face of the elastic member can protrude beyond end portions of the contact terminals on the lid side.

In the card holding apparatus of the present embodiment, the lid can have a through hole formed in a position at which the through hole does not overlap the contact terminal portion and the elastic member. With such a configuration, it is possible to realize a configuration that enables easy removal of the card-type memory medium loaded into the present apparatus while securing the waterproof properties of the present apparatus.

Embodiment

1. Configuration of Card Holding Apparatus

Figure 1:
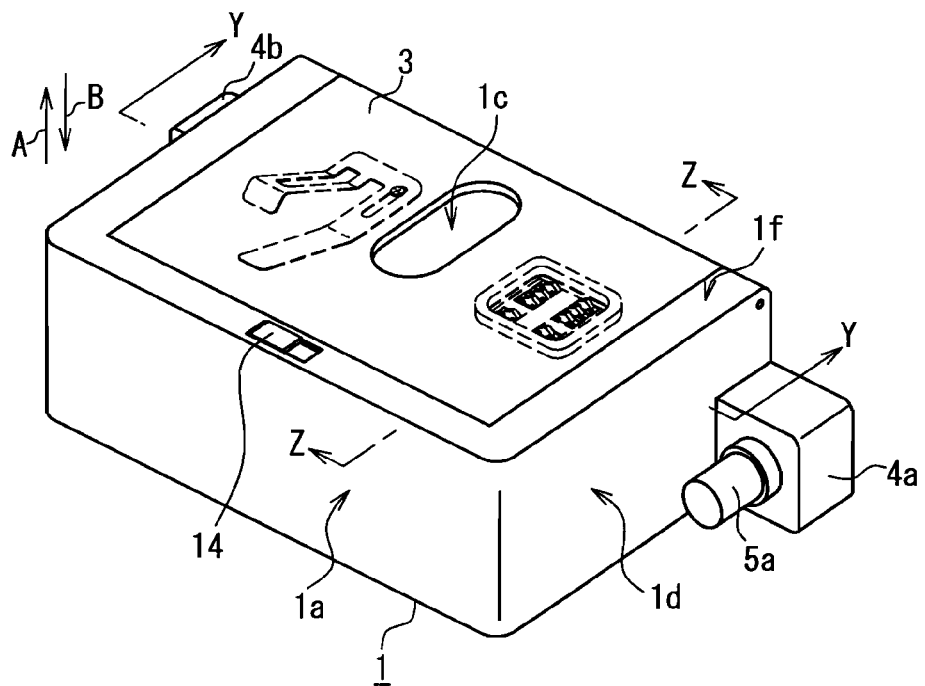
FIG. 1 is a perspective view showing an appearance (on the front face side) of a card holding apparatus according to an embodiment.
Figure 2:
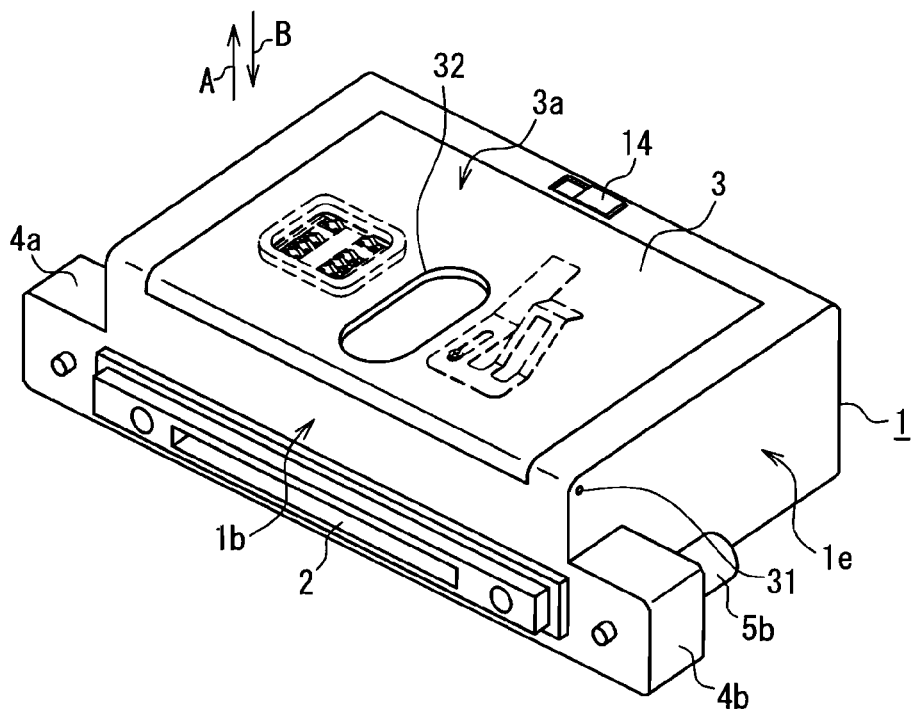
FIG. 2 is a perspective view showing an appearance (on the rear face side) of the card holding apparatus according to the present embodiment.
Figure 3:
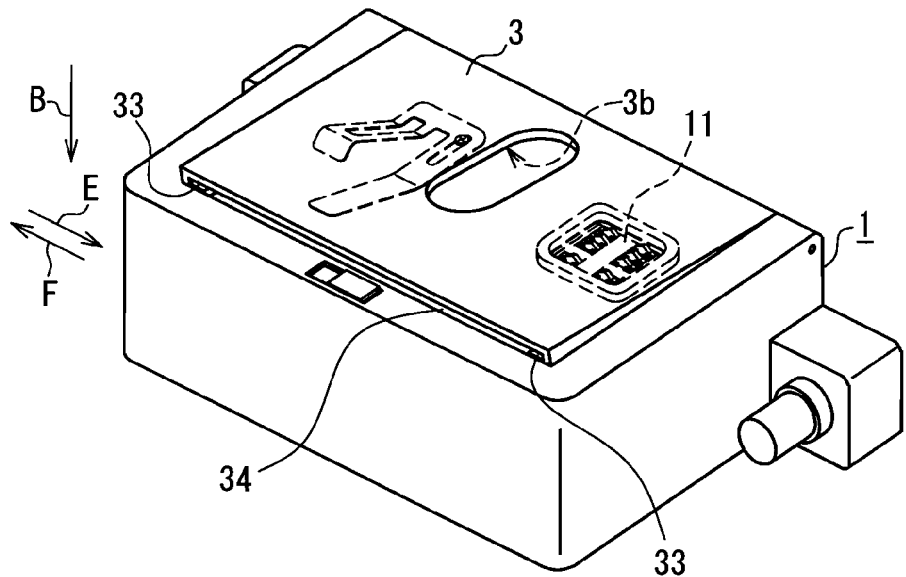
FIG. 3 is a perspective view showing a state in which a lid of the card holding apparatus is open.

FIG. 1 is a perspective view showing an appearance (on the front face side) of a card holding apparatus according to an embodiment. FIG. 2 is a perspective view showing an appearance (on the rear face side) of the card holding apparatus according to the present embodiment. FIG. 3 is a perspective view showing the card holding apparatus in a state in which a lid is open.

As illustrated in FIGS. 1 and 2, the card holding apparatus includes a housing 1 that forms an approximately rectangular parallelepiped. The housing 1 has a built-in electrical circuit component. As illustrated in FIG. 2, a connector 2 is disposed in a rear face 1b of the housing 1. The connector 2 can be connected to various types of information processing apparatuses such as a personal computer 50, which will be described later with reference to FIG. 6. A rib 4a is formed on a right side face 1d of the housing 1 so as to protrude from said side face, which is a side face located on the user's right hand side when the card holding apparatus is positioned with a front face 1a facing a user and an inner face 1c facing upward. The rib 4a supports a screw 5a. A rib 4b is formed on a left side face 1e, which is a face at the back of the right side face 1d, of the housing 1 so as to protrude therefrom. The rib 4b supports a screw 5b. The screws 5a and 5b can be screwed into threaded holes (not illustrated) formed in the later-described personal computer 50. Moreover, a lid 3 and a lock lever 14 are disposed on an upper face 1f, which is one of faces adjacent to the front face 1a, the rear face 1b, the right side face 1d, and the left side face 1e, of the housing 1.

The lid 3 is generally an approximately plate-like member having a rectangular principal plane. The principal plane of the approximately plate-like member of the lid 3 has a larger area than at least the area of a principal plane of a smart card 100 (described later). The lid 3 is supported at the vicinity of one of longer side portions of the approximately plate-like member by the housing 1 via a supporting shaft 31. The lid 3 is supported by the housing 1 so as to be rotatable about the axis of the supporting shaft 31 in the directions indicated by arrows A and B. The lid 3 can rotate between a closed position at which the lid 3 closes at least the inner face 1c of the housing 1 and an open position at which the lid 3 opens the inner face 1c. FIGS. 1 and 2 illustrates a state in which the lid 3 is in the closed position, and FIG. 3 illustrates a state in which the lid 3 is in the open position. The lid 3 includes an opening 34 into which the smart card 100 can be inserted. When the lid 3 is in the open position, the opening 34 is in a position that enables insertion of the smart card 100 (described later) into the opening 34 from the upper face 1f side (see FIG. 1) of the housing 1.

The lid 3 has an obround opening 32 formed approximately in the center of the principal plane.

The opening 32 is intended to expose a part of a back face 100b of the smart card 100 (described later) contained in the card holding apparatus, and is a portion into which the user can insert a finger or the like when drawing the smart card 100 (described later) out of the card holding apparatus. It should be noted that although the opening 32 has an obround shape in the present embodiment, this is an example, and the opening 32 may have an elliptical shape, a rectangular shape, or the like. Preferably, the opening 32 has a shape and a size that allow the smart card 100 (described later) contained in the card holding apparatus to be touched by a fingertip or the like from the outside of the apparatus.

The opening 32 is formed in a position at which the opening 32 does not overlap at least a contact terminal portion 11 and a seal member 12. Thus, when the lid 3 is in the closed position, foreign matter such as water is prevented from intruding into a space surrounded by the seal member 12 (a space in which the contact terminal portion 11 is disposed).

Preferably, the opening 32 is formed approximately in the center of a surface 3a of the lid 3 from the standpoint of enabling the smart card 100 (described later) to slide smoothly when the user draws the smart card 100 (describe later) out of the card holding apparatus. By forming the opening 32 approximately in the center of the surface 3a of the lid 3, the smart card 100 (described later) can be moved approximately parallel to card retaining portions 33, the details of which will be described later, and can be slid smoothly.

On a back face 3b of the lid 3 opposite the inner face 1c of the housing 1, the lid 3 includes a pair of card retaining portions 33 (see FIG. 3) that can retain the smart card 100 (described later). The card retaining portions 33 are members that are formed in the vicinity of both ends of the back face of the lid 3 so as to protrude therefrom and that have an approximately L-shaped profile in cross-section. The card retaining portions 33 are formed along shorter sides of the lid 3. The lid 3 has the opening 34, into which the smart card 100 (described later) can be inserted, formed at a portion between the pair of card retaining portions 33 that have an L-shaped cross-sectional profile. The opening 34 has a width dimension that is larger than at least the dimension in the longitudinal direction of the smart card 100 (described later).

The lock lever 14 can slide in the directions indicated by arrows E and F. When the lock lever 14 is in a position illustrated in FIGS. 1 and 2, the lock lever 14 engages with a claw portion 35 (described later) formed in the lid 3 and positions the lid 3 in the closed position. When the lock lever 14 is in a position illustrated in FIG. 3, the engagement with the claw portion 35 formed in the lid 3 is released, so that the lid 3 is in a rotatable state.

Figure 4:
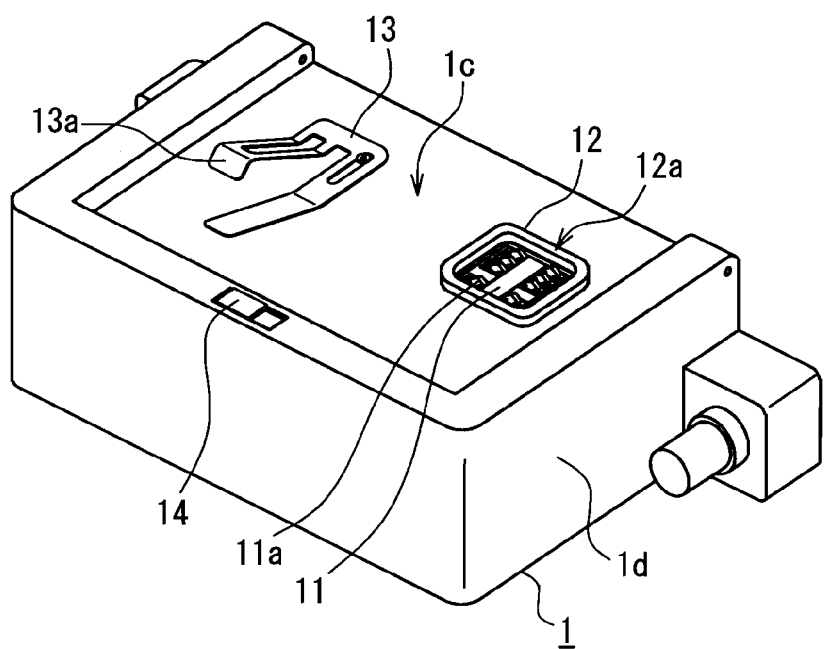
FIG. 4 is a perspective view showing the configuration of a housing.

FIG. 4 clearly illustrates the configuration of the inner face 1c of the housing 1 and shows the configuration of the card holding apparatus with the lid 3 omitted. As illustrated in FIG. 4, the contact terminal portion 11, the seal member 12, and a biasing member 13 are disposed on the inner face 1c.

The contact terminal portion 11 includes a plurality of contact terminals 11a. In the present embodiment, there are as many contact terminals 11a, i.e., eight, as contact areas of a terminal 101 of the smart card 100. The contact terminals 11a are formed of an elastic, approximately plate-like metal. The seal member 12 is disposed around the contact terminal portion 11.

The seal member 12 is disposed so as to surround the periphery of the contact terminal portion 11 and fixed tightly to the inner face 1c with an adhesive or the like. In the present embodiment, the seal member 12 is formed of an elastic resin material. However, the material for the seal member 12 is not limited to resin as long as the material is compressively deformable at least in the direction of the normal to an upper face 12a. In the present embodiment, the seal member 12 is formed of a silicone foam that shows less reduction in hardness even after repeated compressive deformation and less change in hardness with respect to temperature changes and repeated use.

The biasing member 13 is a member for biasing the lid 3 to the open position, and is formed of a plate spring in the present embodiment. The biasing member 13 is not limited to a plate spring and may be formed of a coil spring, an elastic resin, or the like as long as at least the lid 3 can be biased toward the open position. Moreover, in the present embodiment, although the biasing member 13 is provided on the other side of the opening 32 from the contact terminal portion 11, the position of the biasing member 13 can be selected as appropriate. For example, the biasing member 13 can be provided between the opening 32 and the lock lever 14. It should be noted that the biasing member 13 is not necessarily provided and a configuration in which the user can manually rotate the lid 3 to the open position is also possible.

Figure 5:
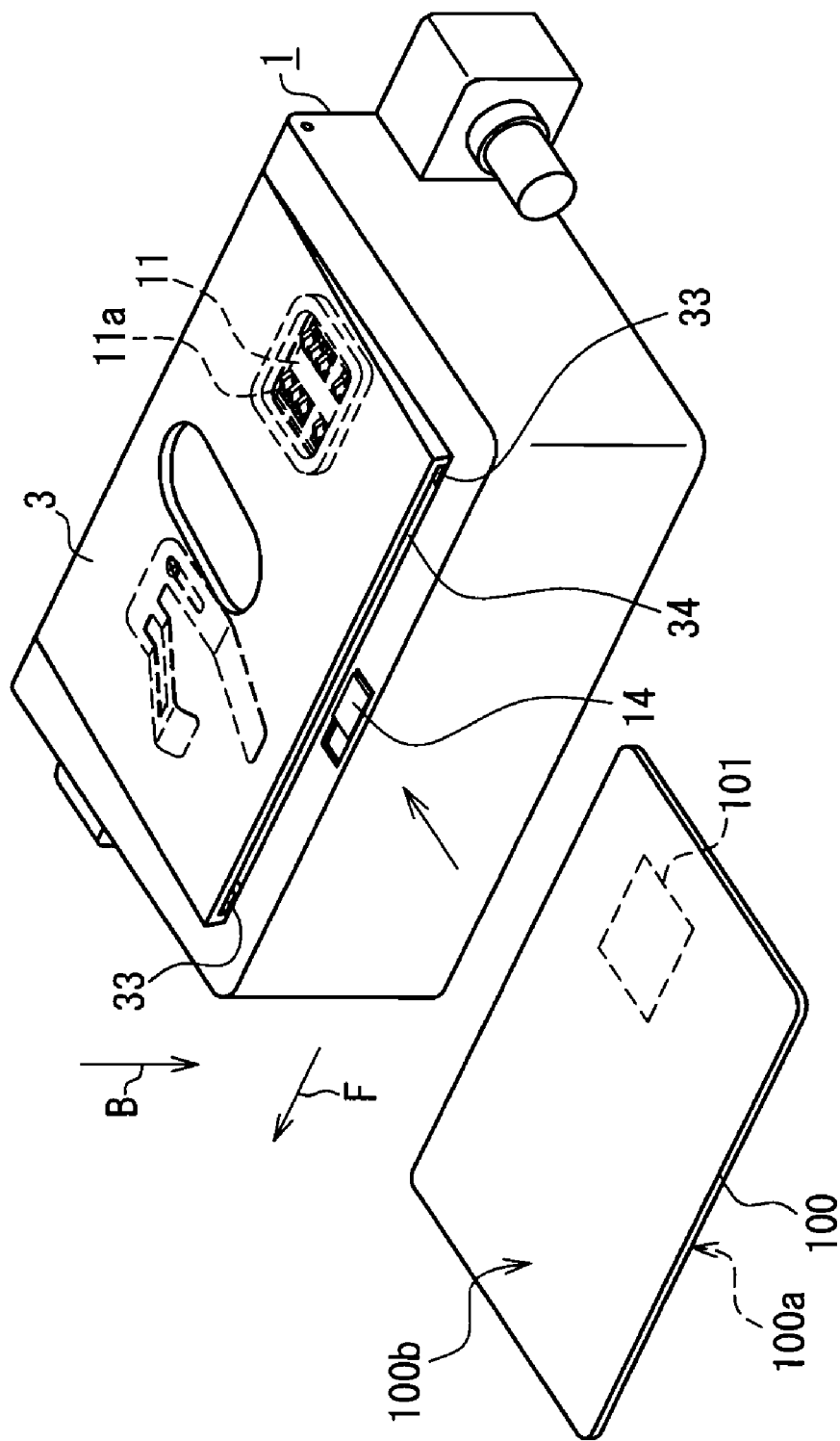
FIG. 5 is a perspective view of a smart card and the card holding apparatus.

FIG. 5 is a perspective view showing a manner in which the smart card is inserted into the card holding apparatus. As to the smart card 100, the physical characteristics and the electrical characteristics are defined based on the international standard ISO 7816, and the Japanese Industrial Standard JIS X 6303 also defines the physical characteristics, the locations and the dimensions of external terminals, and the like. The smart card 100 illustrated in FIG. 5 is in conformity with these standards. Specifically, the smart card 100 includes a main body in the form of a card having dimensions of, for example, about 95 mm in width, about 54 mm in depth, and about 0.5 to 1.0 mm in thickness and an IC chip (an integrated circuit) built into the main body. The terminal 101 is disposed in at least one principal face 100a of the principal faces of the smart card 100. The terminal 101 is connected electrically to the IC chip. The IC chip includes those having a function of being capable of storing various types of information such as security information and those having a function of being capable of performing arithmetic processing. The location and the dimensions of the terminal 101 are also defined in the JIS X 6303 standard, and the locations and the dimensions of the contact terminal portion 11 and the contact terminals 11a of the card holding apparatus are determined so that the card holding apparatus is compatible with a smart card that is in conformity with this standard.

When the smart card 100 is to be inserted into the card holding apparatus, the smart card 100 is positioned so that the terminal 101 is located on the right and the principal face 100a faces the inner face 1c, as illustrated in FIG. 5, and inserted into the opening 34. The position of the smart card 100 inserted into the opening 34 is restricted by the card retaining portions 33, and the smart card 100 is thus retained by the lid 3.

Next, rotating the lid 3 in the direction indicated by arrow B causes the lid 3 to shift to the closed position while still retaining the smart card 100.

Then, the lid 3 can be fixed in the closed position by sliding the lock lever 14 from a position illustrated in FIG. 5 in the direction indicated by arrow F with the lid 3 shifted to the closed position.

Thus, an operation of loading the smart card 100 into the card holding apparatus is completed. As a result of the rotation of the lid 3 to the closed position, the contact terminals 11a of the contact terminal portion 11 and the terminal 101 are brought into contact with each other and thus electrically connected to each other.

Figure 6:
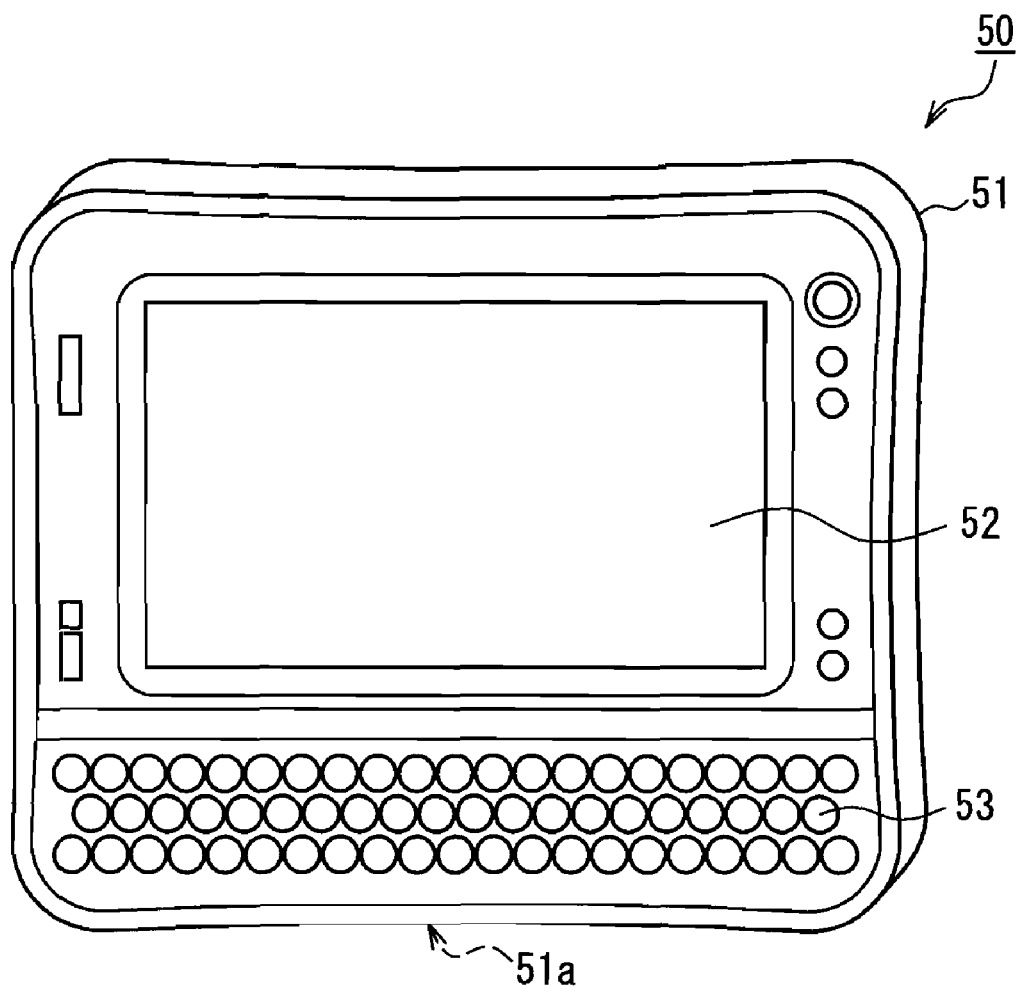
FIG. 6 is a perspective view of a personal computer that is an example of an information processing apparatus to which the card holding apparatus according to the present embodiment can be removably attached.
Figure 7:
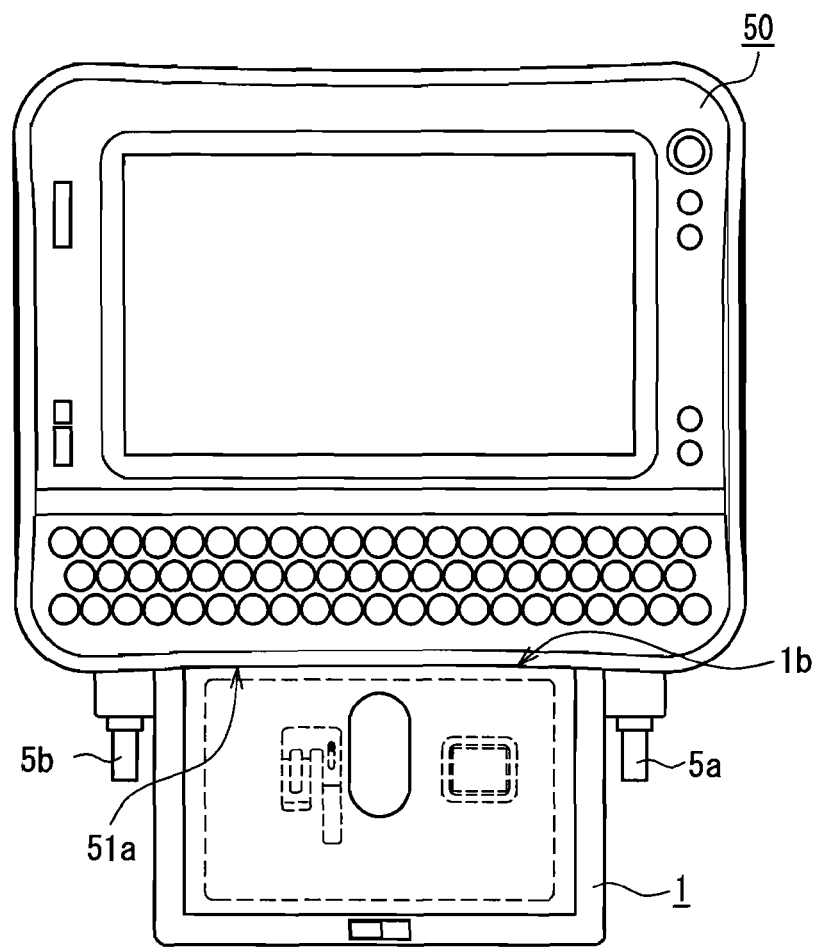
FIG. 7 is a plan view showing a state in which the card holding apparatus is attached to the personal computer.

FIG. 6 is a perspective view of a personal computer (hereinafter referred to as a PC) that is an example of an information processing apparatus to which the card holding apparatus of the present embodiment can be removably attached. FIG. 7 is a plan view showing a state in which the card holding apparatus is attached to the PC. The card holding apparatus of the present embodiment can be removably attached to an information processing apparatus such as the personal computer illustrated in FIG. 6.

As illustrated in FIG. 6, the PC 50 has a central processing unit (CPU), a storage medium, and the like built into a housing 51 having an approximately rectangular parallelepiped shape. The PC 50 includes a display 52 that can display various types of information such as an image on a principal plane of the housing 51. An operating portion 53 through which the user can input various types of information is provided on a face of the housing 51 where the display 52 is provided. A connector (not illustrated) that can be electrically connected to the connector 2 (see FIG. 2) of the card holding apparatus is provided in a side face 51a of the housing 51. Threaded holes (not illustrated) into which the screws 5a and 5b can be screwed are provided in the side face 51a.

As illustrated in FIG. 7, the card holding apparatus can be mechanically attached to the PC 50 and the connectors can be electrically connected to each other by connecting the connectors to each other with the rear face 1b of the card holding apparatus and the side face 51a of the PC 50 facing each other, and screwing the screws 5a and 5b into the threaded holes (not illustrated) provided in the side face 51a of the housing 51. The electrical connection between the card holding apparatus and the PC 50 allows the PC 50 and the card holding apparatus to exchange information. For example, when the smart card 100 (see FIG. 5) equipped with the IC chip having a storage area is loaded into the card holding apparatus, information can be read from or written to the IC chip of the smart card 100 by operating the PC 50. In the case where the smart card 100 is a card for performing authentication in a security system, the PC 50 can read authentication information from the IC chip of the smart card 100 and executes an authentication process within the PC 50.

2. Operations for Loading and Removing the Smart Card 100

FIGS. 8, 9, 10A, and 11A illustrates a cross-section taken along line Z-Z of FIG. 1. FIGS. 10B and 11B illustrates a cross-section taken along line Y-Y of FIG. 1.

Figure 8:
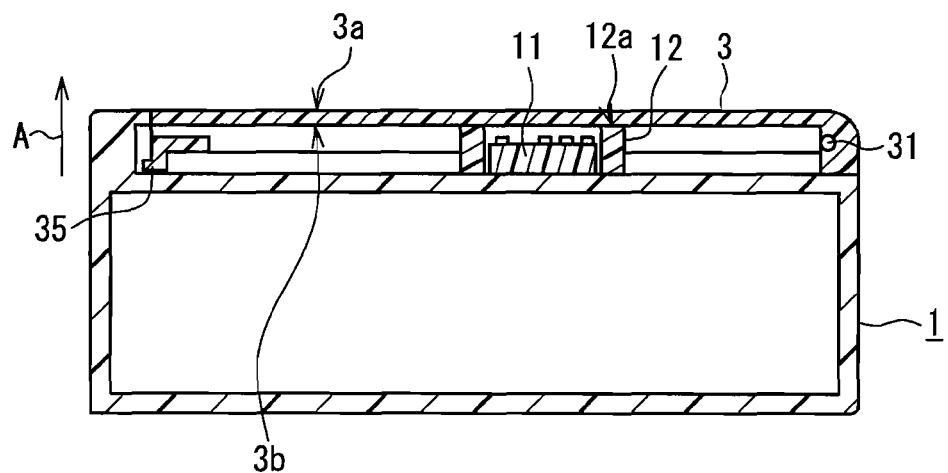
FIG. 8 is a cross-sectional view of the card holding apparatus without the smart card loaded therein.

First, FIG. 8 illustrates a state in which the smart card 100 is not loaded and the lid 3 is in the closed position. In the state illustrated in FIG. 8, the lid 3 is fixed in the closed position with a separately provided lock mechanism (not illustrated). At this time, the back face 3b of the lid 3 is flatly resting in surface contact with the upper face 12a of the seal member 12 on the back face 3b side. Therefore, the space surrounded by the seal member 12 (the space in which the contact terminals 11a are disposed) is hermetically sealed. Even if water intrudes into a space between the lid 3 and the inner face 1c from the outside, the water does not intrude into the space surrounded by the seal member 12, and adhesion of the water to the contact terminals 11a thus does not occur.

It should be noted that, more preferably, the seal member 12 in the state illustrated in FIG. 8 is slightly deformed under compression by being pressed by the lid 3 because the hermetic sealing of the space in which the contact terminal portion 11 is disposed can be secured more reliably.

Moreover, in the present embodiment, since the upper face 12a of the seal member 12 is higher than end portions of the contact terminals 11a on the lid 3 side, there is a gap between the back face 3b of the lid 3 and the contact terminals 11a of the contact terminal portion 11 in the state illustrated in FIG. 8, and there is no contact therebetween. Therefore, the contact terminals 11a will not be deformed under compression for a long period of time, and a reduction in the elastic force of the contact terminals 11a due to plastic deformation thus can be prevented.

Next, when the lock lever 14 (see FIG. 1, for example) is slid in the direction indicated by arrow E from the position illustrated in FIG. 1 to the position illustrated in FIG. 3, the locking between the lock mechanism coupled to the lock lever 14 and the claw portion 35 is released. Due to the biasing force of the biasing member 13 (see FIG. 4), the lid 3 rotates about the axis of the supporting shaft 31 in the direction indicated by arrow A.

Figure 9:
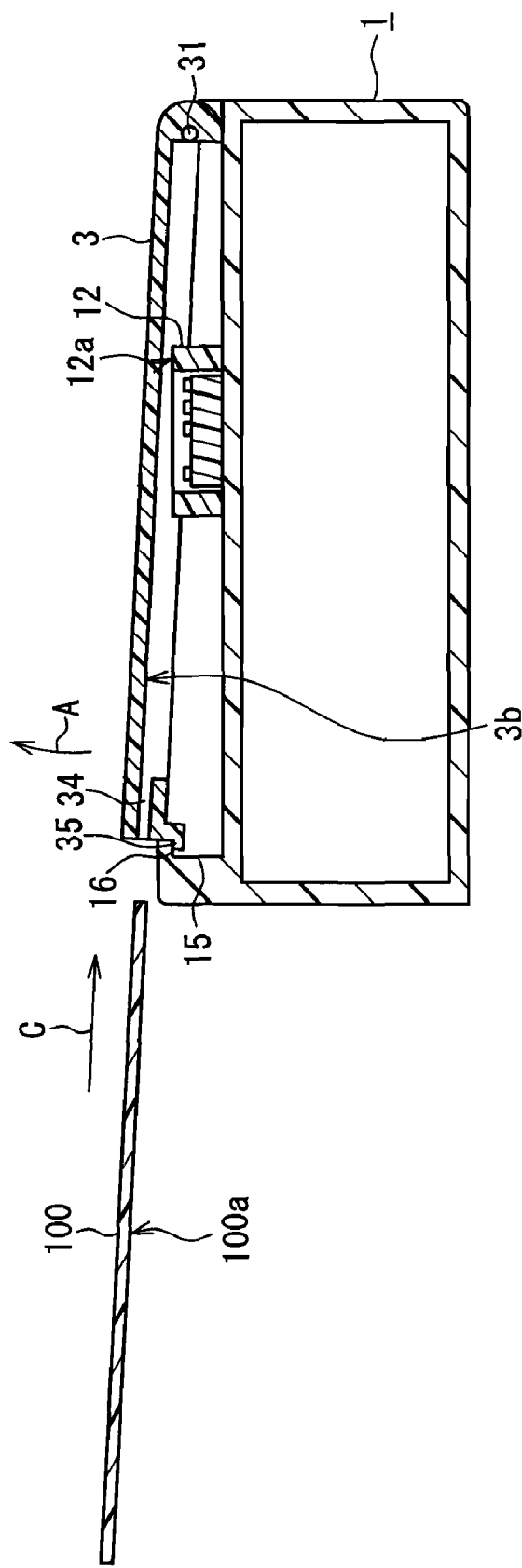
FIG. 9 is a cross-sectional view of the card holding apparatus when the lid is in an open position.

FIG. 9 illustrates a state in which the lid 3 has rotated to the open position. In the open position illustrated in FIG. 9, rotation of the lid 3 in the direction indicated by arrow A is restricted by the claw portion 35 coming into contact with a restricting portion 16 formed at an upper end of a recess 15, and the lid 3 thus is positioned.

Next, the smart card 100 is inserted into the opening 34 in the direction indicated by arrow C. At this time, the smart card 100 can be guided by the pair of card retaining portions 33, which will be described later with reference to FIG. 10B, formed on the back face 3b of the lid 3, while being inserted in the direction indicated by arrow C.

Figure 10A:
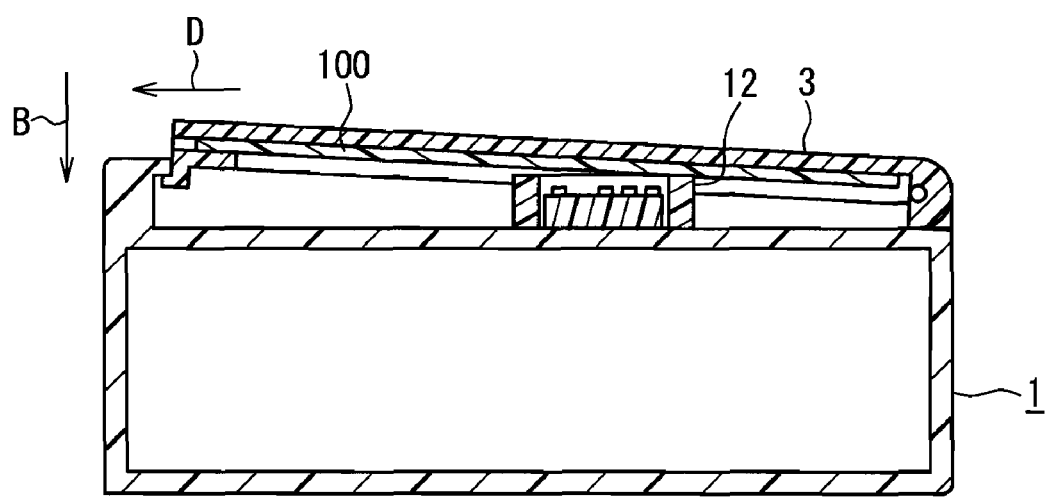
FIG. 10A is a cross-sectional view of the card holding apparatus with the smart card inserted therein.
Figure 10B:
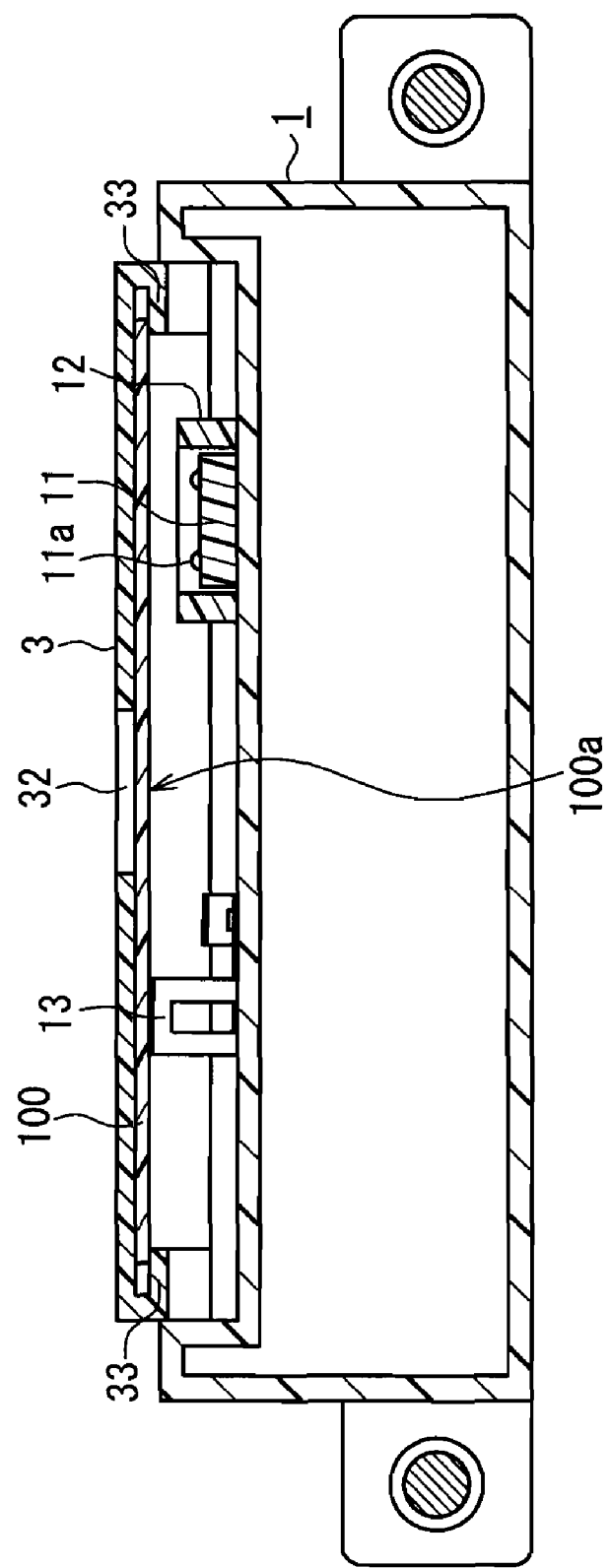
FIG. 10B is a cross-sectional view of the card holding apparatus with the smart card inserted therein.
Figure 10C:
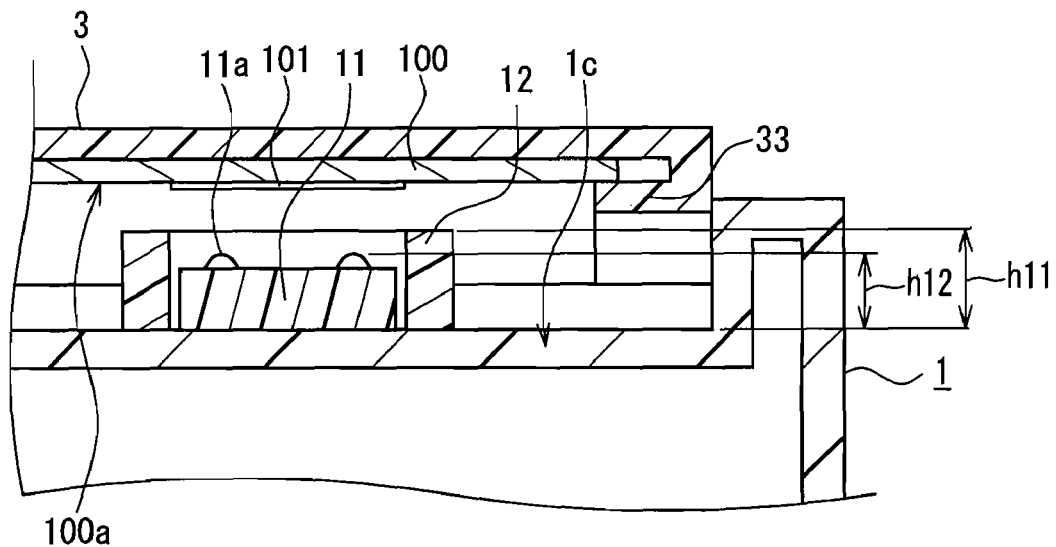
FIG. 10C is a cross-sectional view of a relevant part of the card holding apparatus.

FIGS. 10A and 10B illustrates a state in which the smart card 100 is inserted into the space sandwiched between the lid 3 and the inner face 1c. FIG. 10C is a cross-sectional view of a relevant part in the vicinity of the contact terminal portion 11 of FIG. 10A. As illustrated in FIG. 10B, both ends of the smart card 100 in the longitudinal direction are supported by the card retaining portions 33 formed on the lid 3, and the smart card 100 is thereby retained by the lid 3. Moreover, in the state in which the smart card 100 is inserted into the lid 3, since a biasing portion 13a of the biasing member 13 comes into contact with the principal face 100a of the smart card 100 to apply a contact pressure thereon as illustrated in FIG. 10B, it is difficult for the smart card 100 to move in a direction (the direction indicated by arrow D) in which the smart card 100 slips out of the card holding apparatus. Therefore, when the lid 3 is in the open position, even if the card holding apparatus is positioned so that the opening 34 faces vertically downward, the smart card 100 inserted into the card holding apparatus can be prevented from falling due to the weight thereof.

Next, the lid 3 is rotated in the direction indicated by arrow B.

Figure 11A:
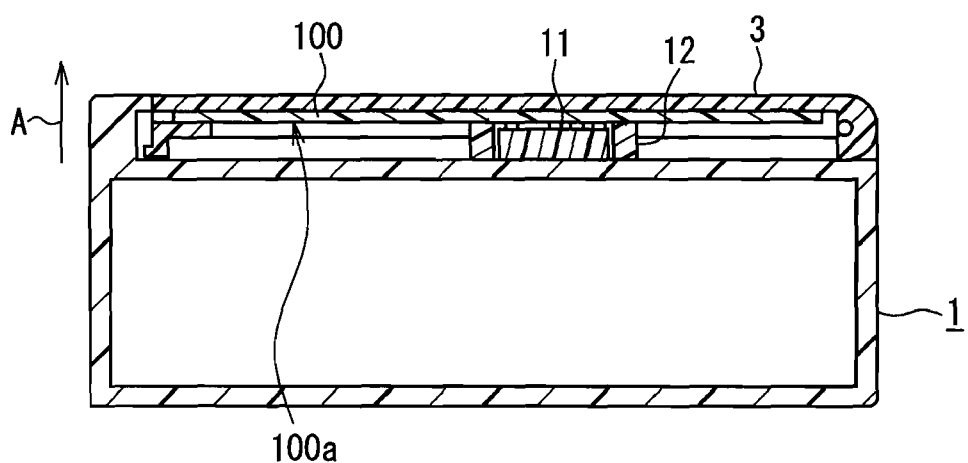
FIG. 11A is a cross-sectional view of the card holding apparatus when the lid is in a closed position.
Figure 11B:
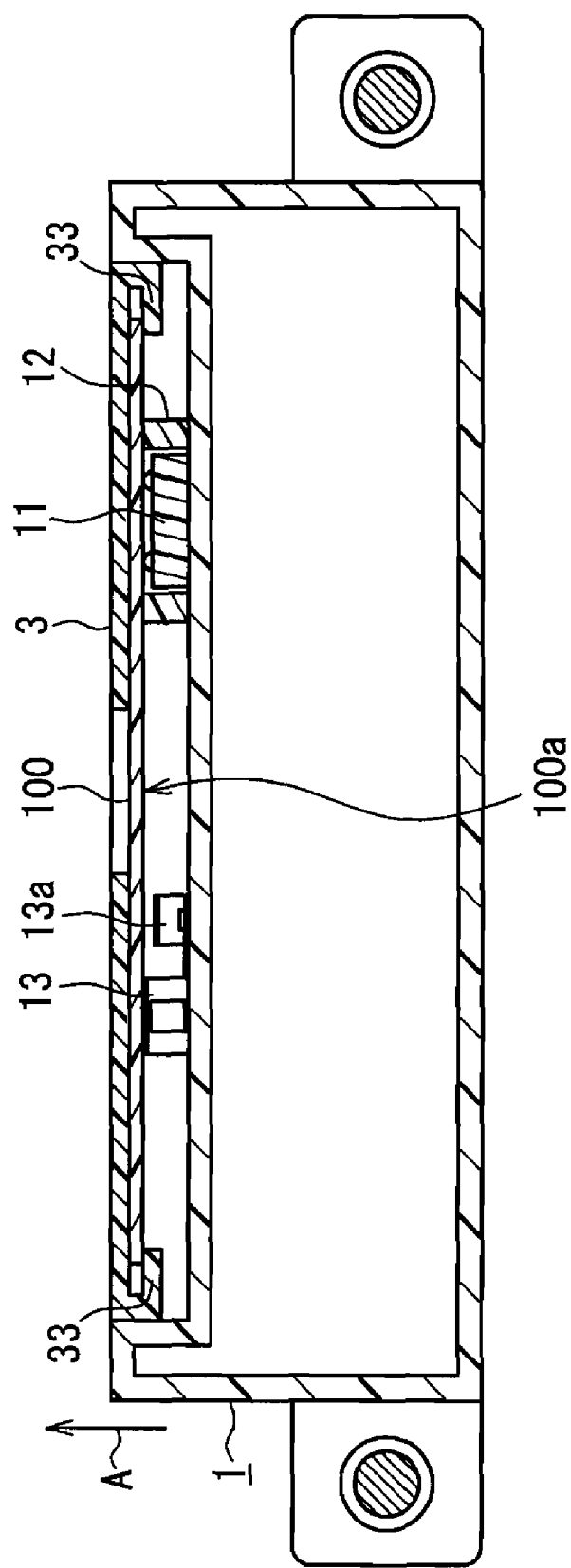
FIG. 11B is a cross-sectional view of the card holding apparatus when the lid is in the closed position.
Figure 11C:
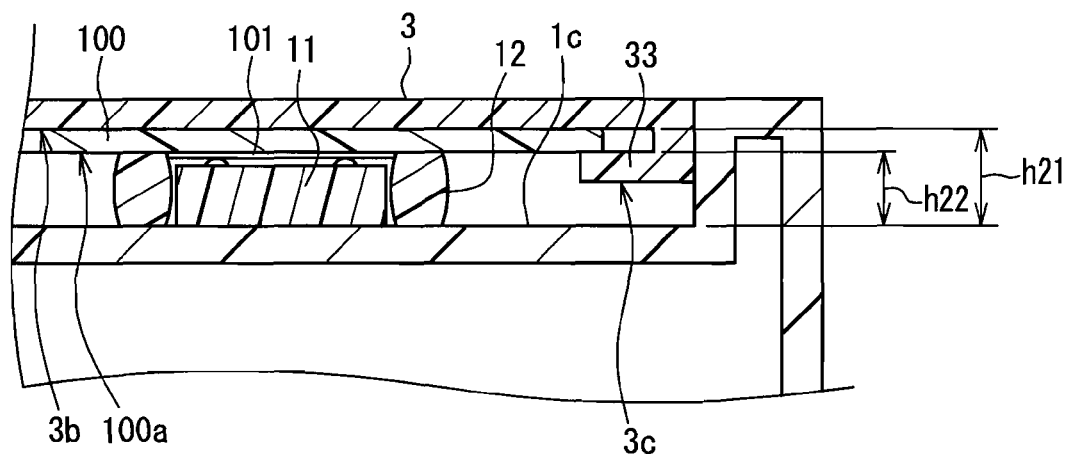
FIG. 11C is a cross-sectional view of a relevant part of the card holding apparatus.

FIGS. 11A and 11B illustrates a state in which the lid 3 has rotated to the closed position. FIG. 11C is a cross-sectional view of a relevant part in the vicinity of the contact terminal portion 11 of FIG. 11A. As illustrated in FIGS. 11A and 11B, when the lid 3 is rotated to the closed position, the principal face 100a of the smart card 100 comes into contact with the upper face 12a of the seal member 12 to compressively deform the seal member 12. The terminal 101 of the smart card 100 comes into contact with the contact terminals 11a of the contact terminal portion 11.

Specifically, here, the height dimension of the seal member 12 and the height dimension of the contact terminals 11a with respect to the inner face 1c when the smart card 100 or the lid 3 is not in contact with the seal member 12 are assumed to be h11 and h12, respectively, as illustrated in FIG. 10C, and the gap between the back face 3b of the lid 3 and the inner face 1c and the gap between the inner face 1c and the principal face 100a of the smart card 100 when the lid 3 is shifted to the closed position are assumed to be h21 and h22, respectively, as illustrated in FIG. 11C. Then, the following relationship exists:

$$h22 \leq h12$$

Therefore, the shift of the lid 3 to the closed position causes the eight contact regions of the terminal 101 to come into contact with the respective contact terminals 11a while compressively deforming the contact terminals 11a. Moreover, the following relationship exists:

$$h22 < h11$$

Therefore, the shift of the lid 3 to the closed position causes the smart card 100 to compressively deform the seal member 12, so that the space in which the contact terminal portion 11 is disposed can be hermetically sealed in a reliable manner. Moreover, the following relationship exists:

$$h21 \leq h11$$

Therefore, when the smart card 100 is not inserted into the card holding apparatus and the lid 3 has been shifted to the closed position as illustrated in FIG. 8, the upper face 12a of the seal member 12 comes into contact with the back face 3b of the lid 3 (when h21=h11) or the seal member 12 is deformed under compression (when h21<h11), so that the contact terminal portion 11 and the vicinity thereof can be hermetically sealed.

Figure 11D:
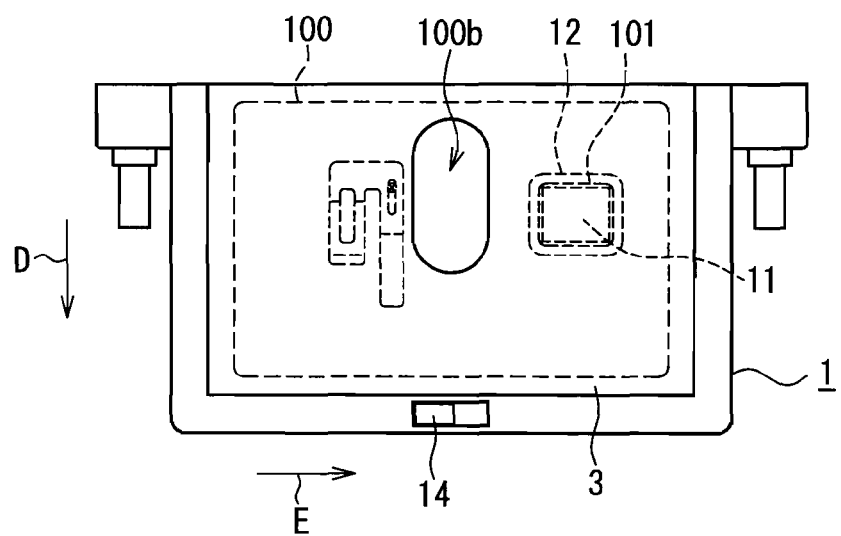
FIG. 11D is a plan view of the card holding apparatus when the lid is in the closed position.

Furthermore, as illustrated in FIG. 11D, since the seal member 12 is disposed so as to surround the periphery of the contact terminal portion 11, when the lid 3 retaining the smart card 100 is shifted to the closed position, the seal member 12 comes into contact with the periphery of the terminal 101 of the smart card 100. Therefore, the terminal portion 11 and the terminal 101 can be hermetically sealed.

Thus, the operation of loading the smart card 100 into the card holding apparatus is completed.

Figure 12:
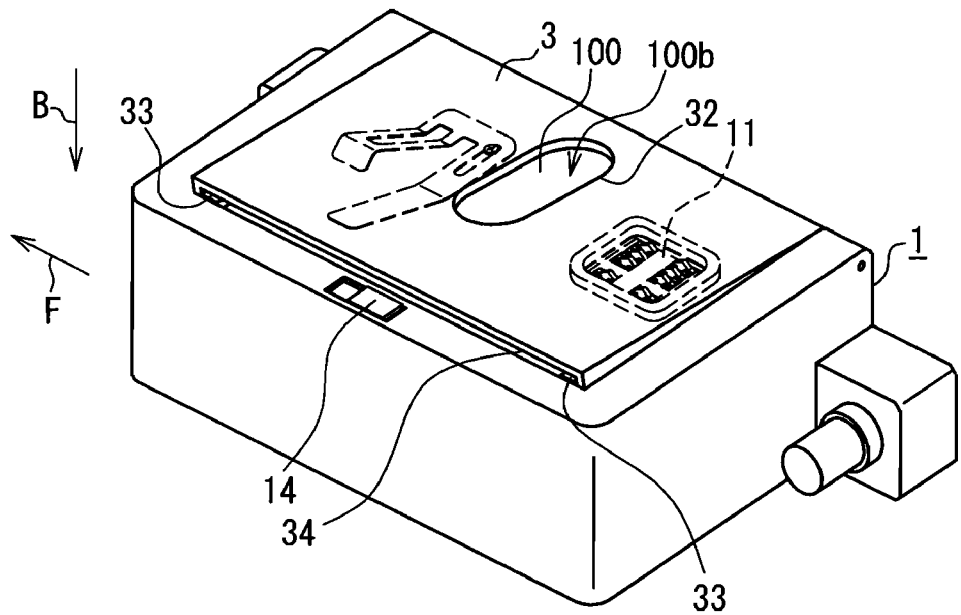
FIG. 12 is a perspective view of the card holding apparatus with the smart card inserted therein.

When the smart card 100 loaded into the card holding apparatus is to be removed, the lock lever 14 is first slid from a position illustrated in FIG. 11D in the direction indicated by arrow E and shifted to a position illustrated in FIG. 12. The locking of the lid 3 in the closed position is thereby released. A biasing force in the direction indicated by arrow A is exerted on the lid 3 by the biasing member 13 to shift the lid 3 to the open position illustrated in FIG. 12.

Next, the user inserts a finger into the opening 32 and touches the back face 100b of the smart card 100 with the tip of the finger. The fingertip is moved in the direction indicated by arrow D as it is so that the smart card 100 is slid in the direction indicated by arrow D by friction between the fingertip and the back face 100b of the smart card 100.

After the smart card 100 is slid to a position at which a part of the smart card 100 protrudes to the outside via the opening 34, the smart card 100 can be drawn out of the card holding apparatus by pinching the part of the smart card 100 protruding from the opening 34 and pulling the smart card 100 in the direction indicated by arrow D.

After drawing out the smart card 100, it is preferable to shift the lid 3 to the closed position promptly in order to prevent the intrusion of foreign matter between the housing 1 and the lid 3.

3. Effects of the Embodiment, and Others

The card holding apparatus according to the present embodiment includes the seal member 12 that is provided so as to surround the periphery of the contact terminal portion 11. The seal member 12 comes into close contact with the periphery of the terminal 101 when the lid 3 is put in the closed position with the smart card 100 retained by the lid 3. Thus, even if foreign matter such as water or dust intrudes into the space between the lid 3 and the housing 1, adhesion of such foreign matter to the contact terminals 11a or the terminal 101 can be prevented.

The seal member 12 of the card holding apparatus according to the present embodiment is formed of a compressively deformable material, and when the lid 3 is rotated to the closed position, the seal member 12 is pressed by the smart card 100 and deformed under compression. Thus, the hermetic sealing of the space in which the contact terminal portion 11 is disposed (the space surrounded by the seal member 12) can be improved.

In the card holding apparatus according to the present embodiment, when the above-described relationships of h11, h12, h21, and h22 can be maintained, the contact terminals 11a can be lifted toward the lid 3 in conjunction with the transition of the lid 3 from an opened state to a closed state. The contact terminal portion 11 in the case of a configuration in which the contact terminals 11a are integrated into the contact terminal portion 11 can be lifted toward the lid 3 in conjunction with the transition of the lid 3 from an opened state to a closed state. Thus, a more reliable electrical connection can be realized between the terminal 101 of the smart card 100 and the contact terminals 11a when the lid 3 is in the closed state.

In the card holding apparatus according to the present embodiment, when the lid 3 is rotated to the closed position without the smart card 100 retained by the lid 3, the back face 3b of the lid 3 comes into contact with the seal member 12 or the back face 3b of the lid 3 presses the seal member 12 to compressively deform the seal member 12. Thus, even when the smart card 100 is not loaded, the space in which the contact terminal portion 11 is disposed (the space surrounded by the seal member 12) can be hermetically sealed, and adhesion of foreign matter to the contact terminals 11a can be reduced.

In the card holding apparatus according to the present embodiment, when the lid 3 is in the open position, the claw portion 35 comes into contact with the restricting portion 16. Thus, the opening amount can be kept to a minimum, so that the intrusion of foreign matter such as water or dust into the space between the lid 3 and the housing 1 can be minimized.

The card holding apparatus according to the present embodiment includes the biasing member 13 that biases the lid 3 toward the open position. Thus, when the lid 3 is to be shifted from the closed position to the open position, the lid 3 is shifted to the open position by sliding the lock lever 14 from the position illustrated in FIG. 1 to the position illustrated in FIG. 3. Accordingly, fewer steps are required to open the lid 3. In other words, in the case where the biasing member 13 is not provided, it is necessary to perform an operation of sliding the lock lever 14 and an operation of manually rotating the lid 3 from the closed position to the open position, but with the biasing member 13, the lid 3 can be shifted from the closed position to the open position simply by performing the operation of sliding the lock lever 14.

In the card holding apparatus according to the present embodiment, the biasing member 13 comes into pressure contact with the principal face 100a of the smart card 100 inserted into the lid 3, so that displacement of the smart card 100 can be suppressed. Thus, even when the card holding apparatus is positioned so that the opening 34 faces vertically downward with the lid 3 in the open position, the smart card 100 does not easily fall out of the apparatus. Therefore, the smart card 100 can be prevented from, for example, being damaged or lost when falling.

In the card holding apparatus according to the present embodiment, the seal member 12 is disposed so as to surround the periphery of the contact terminal portion 11. Thus, the seal member 12 can be made smaller than that in a configuration as disclosed in JP H08-077312A, in which the periphery of a smart card is hermetically sealed. Therefore, the material cost for forming the seal member 12 can be reduced.

In the card holding apparatus according to the present embodiment, the seal member 12 is disposed only around the contact terminal portion 11. Thus, even when the opening 32 composed of a through hole is formed in the lid 3, adhesion of foreign matter such as water to the interior of the contact terminal portion 11 can be prevented. Since the opening 32 can be formed, the card holding apparatus can be equipped with a configuration that enables easy removal of the smart card 100.

As illustrated in FIG. 11D, the opening 32 is formed in a position at which the opening 32 does not overlap the contact terminal portion 11 and the seal member 12, so that adhesion of foreign matter such as water to the contact terminals 11a can be prevented even when foreign matter such as water intrudes into the space between the housing 1 and the lid 3 through the opening 32 in the state in which the lid 3 has been shifted to the closed position.

It should be noted that although the card holding apparatus of the present embodiment is a card holding apparatus into which the smart card 100 can be loaded, the medium that can be loaded is not limited to a smart card. Any medium can be loaded as long as the medium includes an electrical contact terminal on at least one principal face thereof.

Moreover, although the present embodiment is provided with the biasing member 13, the biasing member 13 is not necessarily provided. In the case where the biasing member 13 is not provided, loading/removal of the smart card 100 can be made possible by the user manually rotating the lid 3 to the open position after unlocking the lid 3.

Figure 13:
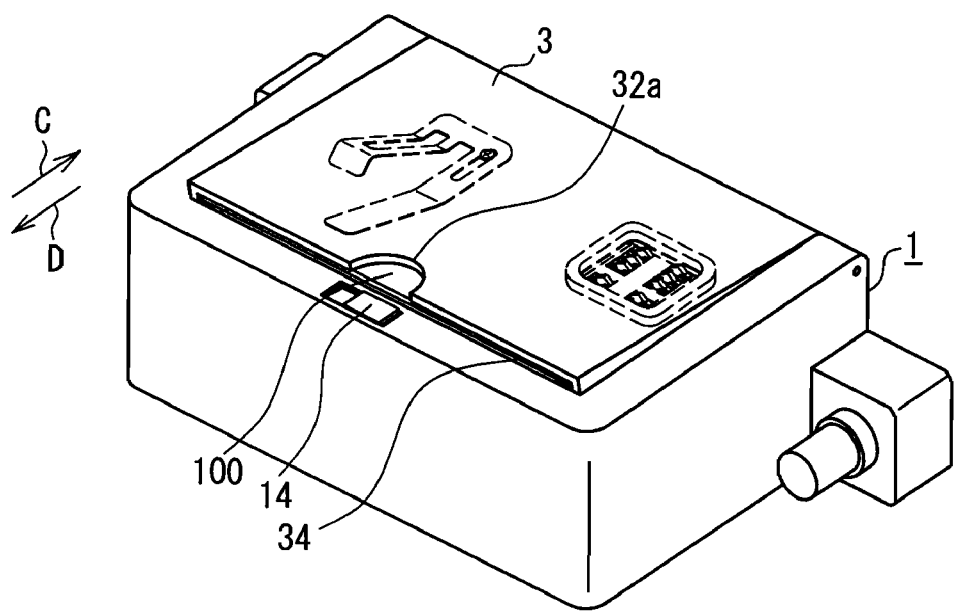
FIG. 13 is a perspective view showing a variation of the card holding apparatus.

Moreover, in the present embodiment, the opening 32 is provided approximately in the center of the lid 3 in order to facilitate removal of the smart card 100. However, as illustrated in FIG. 13, a configuration in which a notch portion 32*a* is formed at an end portion of the lid 3 is also possible. According to the configuration illustrated in FIG. 13, when the smart card 100 is to be drawn out of the card holding apparatus, the lid 3 is rotated to the open position and an end portion of the smart card 100 can thus be grasped. The user can draw the smart card 100 out of the card holding apparatus by grasping the end portion of the smart card 100 and sliding the smart card 100 in the direction indicated by arrow D. In other words, with the configuration of the present embodiment, it is necessary to independently perform an operation of sliding the smart card 100 and an operation of drawing the smart card 100 out of the card holding apparatus, whereas with the configuration illustrated in FIG. 13, the sliding operation and the drawing operation can be performed at the same time.

Moreover, although the card holding apparatus of the present embodiment is of a type (a so-called external type) that can be removably attached to the PC 50 as illustrated in FIG. 5, the present invention is also applicable to a type that is built into an information processing apparatus such as the PC 50.

Moreover, the card holding apparatus of the present invention is not limited to a card reader that can be removably attached to a mobile personal computer as in the present embodiment and can be applied to in-vehicle units for ETC (electronic toll collection) systems and SIM (subscriber identity module) card slots installed in mobile phone handsets. In particular, the card holding apparatus is effective when installed in equipment that can be used outdoors, such as in-vehicle ETC units for use on motorcycles and mobile phone handsets.

The present invention is useful for a card holding apparatus into which a card-type memory medium including a terminal on a principal face thereof can be removably loaded.

With respect to the present embodiment, the following additional remarks are disclosed.

(Note 1)

A card holding apparatus into which a card-type memory medium having a terminal on a principal face thereof can be loaded, the card holding apparatus comprising:

a housing;

a lid that is rotatably supported by the housing and disposed on a principal face of the housing;

retaining portions that are formed on an inner face of the lid opposite the principal face of the housing and can retain the card-type memory medium;

contact terminals that are disposed on the principal face of the housing opposite the lid and can be brought into contact with the terminal of the card-type memory medium;

a contact terminal portion in which the contact terminals are arranged; and an elastic member surrounding a periphery of the contact terminal portion, wherein a distal end face of the elastic member opposite the lid has a height that allows the distal end face of the elastic member to come into surface contact in a flat manner with the inner face of the lid when the lid is in a position in close proximity to the principal face of the housing.

(Note 2)

The card holding apparatus according to Note 1, wherein the elastic member has a height that allows the elastic member to come into surface contact with the principal face of the card-type memory medium when the lid with the card-type memory medium retained is in the position in close proximity to the principal face of the housing.

(Note 3)

The card holding apparatus according to Note 1, wherein the distal end face of the elastic member protrudes beyond end portions of the contact terminals on the lid side.

(Note 4)

The card holding apparatus according to Note 1, wherein the lid has a through hole formed in a position at which the through hole does not overlap the contact terminal portion and the elastic member.

What is claimed is:

1. A card holding apparatus into which a card-type memory medium having a terminal on a principal face thereof can be loaded, the card holding apparatus comprising:

a housing;

a lid that is rotatably supported by the housing and disposed on a principal face of the housing;

retaining portions that are formed on an inner face of the lid opposite the principal face of the housing and can retain the card-type memory medium;

contact terminals that are disposed on the principal face of the housing opposite the lid and can be brought into contact with the terminal of the card-type memory medium;

a contact terminal portion in which the contact terminals are arranged; and an elastic member surrounding an entire periphery of the contact terminal portion to seal the contact terminal portion, wherein a distal end face of the elastic member opposite the lid has a height that allows the distal end face of the elastic member to come into surface contact in a flat manner with the inner face of the lid when the lid is in a position in close proximity to the principal face of the housing.

2. The card holding apparatus according to claim 1, wherein the elastic member has a height that allows the elastic member to come into surface contact with the principal face of the card-type memory medium when the lid with the card-type memory medium retained is in the position in close proximity to the principal face of the housing.

3. The card holding apparatus according to claim 1, wherein the distal end face of the elastic member protrudes beyond end portions of the contact terminals on the lid side.

4. The card holding apparatus according to claim 1, wherein the lid has a through hole formed in a position at which the through hole does not overlap the contact terminal portion and the elastic member.

* * * * *